US008060607B2

(12) United States Patent
Tonnesen

(10) Patent No.: US 8,060,607 B2
(45) Date of Patent: *Nov. 15, 2011

(54) SYSTEM AND METHOD FOR DETECTION OF ABERRANT NETWORK BEHAVIOR BY CLIENTS OF A NETWORK ACCESS GATEWAY

(75) Inventor: Steven D. Tonnesen, Cedar Park, TX (US)

(73) Assignee: Rocksteady Technologies, LLC, Austin, TX (US)

( * ) Notice: Subject to any disclaimer, the term of this patent is extended or adjusted under 35 U.S.C. 154(b) by 85 days.

This patent is subject to a terminal disclaimer.

(21) Appl. No.: 12/752,564

(22) Filed: Apr. 1, 2010

(65) Prior Publication Data

US 2010/0191850 A1  Jul. 29, 2010

Related U.S. Application Data

(63) Continuation of application No. 12/536,700, filed on Aug. 6, 2009, which is a continuation of application No. 11/076,652, filed on Mar. 10, 2005, now Pat. No. 7,590,728.

(60) Provisional application No. 60/551,697, filed on Mar. 10, 2004.

(51) Int. Cl.
  *G06F 15/173* (2006.01)
(52) U.S. Cl. ............... 709/224; 709/223; 709/225
(58) Field of Classification Search ............. 709/224
  See application file for complete search history.

(56) References Cited

U.S. PATENT DOCUMENTS

| 6,199,113 | B1 | 3/2001 | Alegre et al. |
| 6,678,733 | B1 | 1/2004 | Brown et al. |
| 6,708,212 | B2 | 3/2004 | Porras et al. |
| 7,272,646 | B2 | 9/2007 | Cooper et al. |
| 7,509,625 | B2 | 3/2009 | Johnston et al. |
| 7,587,512 | B2 | 9/2009 | Ta et al. |
| 7,590,728 | B2 | 9/2009 | Tonnesen et al. |
| 7,610,621 | B2 | 10/2009 | Turley et al. |
| 7,624,438 | B2 | 11/2009 | White |
| 2005/0204169 | A1 | 9/2005 | Tonnesen |
| 2006/0173992 | A1 | 8/2006 | Weber et al. |

OTHER PUBLICATIONS

Notice of Allowance for U.S. Appl. No. 12/536,700, mailed May 6, 2011, 8 pgs.
Office Action issued in U.S. Appl. No. 11/076,652, dated Jan. 25, 2008, 9 pages.
Office Action issued in U.S. Appl. No. 11/076,652, dated Jul. 22, 2008, 8 pages.

(Continued)

*Primary Examiner* — Kevin Bates
*Assistant Examiner* — Joe Chacko
(74) *Attorney, Agent, or Firm* — Sprinkle IP Law Group

(57) ABSTRACT

A system and method for detecting aberrant network behavior. One embodiment provides a system of detecting aberrant network behavior behind a network access gateway comprising a processor, a first network interface coupled to the processor, a second network interface coupled to the processor, a storage media accessible by the processor and a set of computer instructions executable by the processor. The computer instructions can be executable to observe network communications arriving at the first network interface from multiple clients and determine when the traffic of a particular client is indicative of malware infection or other hostile network activity. If the suspicious network communication is determined to be of a sufficient volume, type, or duration the computer instructions can be executable to log such activity to storage media, or to notify an administrative entity via either the first network interface or second network interface, or to make the computer instructions be executable to perform other configured actions related to the functioning of the network access gateway.

21 Claims, 6 Drawing Sheets

OTHER PUBLICATIONS

Office Action issued in U.S. Appl. No. 11/076,652, dated Dec. 11, 2008, 8 pages.
Office Action issued in U.S. Appl. No. 11/076,672, dated Jul. 21, 2009, 11 pages.
Notice of Allowability issued in U.S. Appl. No. 11/076,646, dated Jul. 24, 2009, 7 pages.
Crandell et al., "A Secure and Transparent Firewall Web Proxy," Oct. 2003, USENIX, Retrieved from the internet on Jul. 15, 2009, 8 pages; <URL: http://www.usenix.org/event/lisa03/tech/full_papers/crandell/crandell.pdf>.
Sommerlad, "Reverse Proxy Patterns," 2003 Retrieved from the Internet on Jul. 15, 2009, 27 pages; <URL: http://www.modsecurity.org/archive/ReverseProxy-book-1.pdf>.
Williamson, Matthew, "Throttling Viruses: Restricting Propagation to Defeat Malicious Mobile Code," Proceedings of the 18th Annual Computer Security Applications Conference, 2002 IEEE, 8 pages.
Williamson, et al, "Virus Throttling," Virus Bulletin Research Feature 1, Mar. 2003, 4 pages.
Office Action issued in U.S. Appl. No. 11/076,672, dated Jan. 7, 2010, 9 pages.
Office Action issued in U.S. Appl. No. 11/536,700, dated Dec. 9, 2010, 12 pages.

FIG. 4

CONFIGURATION FOR SUSPICION ACCUMULATOR

DEFINITION OF CHT (CLIENT HISTORY TRACKING) STRUCTURES

| ROWNAME | # CELLS | TIME/CELL | CONTENT SPECIFICATION |
|---|---|---|---|
| Portscan1 | 6 | 10s | ACCUMULATE POINTS FROM PACKET NOTICES |
| Portscan2 | 5 | 60s | AGGREGATE FROM Portscan1 OVER TIME |
| Portscan3 | 3 | 300s | AGGREGATE FROM Portscan2 OVER TIME |
| PortscanSpike | 6 | 10s | TRACK CELL-TO-CELL CHANGE FROM Portscan1 |
| ... | | | |
| Spam1 | 10 | 60s | ACCUMULATE POINTS FROM PACKET NOTICES |
| ... | | | |
| PortReconIndex | 6 | 20s | SET VALUE (Portscan1 VALUE) + (3 x NewPartnerCount1 VALUE) + ... |

32

MAPPING OF RULE TAGS TO CHT ROWS

| OBSERVATION RULE TAG | TARGET CHT ROWNAME | POINT SCALING FACTOR |
|---|---|---|
| PORTSCANNING-HIGHPORT | Portscan1 | 1 |
| PORTSCANNING-PRIVILEGEDPORT | Portscan1 | 3 |
| ... | | |
| SPAMMING | Spam1 | 1 |
| ... | | |

33

DEFINITION OF TESTS AND THRESHOLDS TO BE PERIODICALLY APPLIED TO CHT STRUCTURES

| TEST # | CHT ROWNAME | TEST DESCRIPTION |
|---|---|---|
| 1 | Portscan1 | ALERT IF ANY 200 POINTS COLLECTED IN 10 SECONDS |
| 2 | Portscan1 | ALERT IF ANY 600 POINTS COLLECTED IN 60 SECONDS |
| 3 | Portscan2 | ALERT IF ANY 900 POINTS COLLECTED IN 3 MINUTES |
| ... | | |
| 9 | PortscanSpike | ALERT IF ANY CELL > 80 |
| ... | | |
| 14 | Spam1 | ALERT IF ANY TWO CELLS > 3 |
| ... | | |
| 22 | PortReconIndex | ALERT IF THE SUM OF ANY 3 OUT OF 5 CELLS EXCEEDS 110 |
| ... | | |

34

26

SYSTEM AND METHOD FOR DETECTION OF ABERRANT NETWORK BEHAVIOR BY CLIENTS OF A NETWORK ACCESS GATEWAY

RELATED APPLICATIONS

This application is a continuation of U.S. patent application Ser. No. 12/536,700, filed Aug. 6, 2009, entitled "SYSTEM AND METHOD FOR DETECTION OF ABERRANT NETWORK BEHAVIOR BY CLIENTS OF A NETWORK ACCESS GATEWAY," which is a continuation of U.S. patent application Ser. No. 11/076,652 filed Mar. 10, 2005, entitled "SYSTEM AND METHOD FOR DETECTION OF ABERRANT NETWORK BEHAVIOR BY CLIENTS OF A NETWORK ACCESS GATEWAY," (U.S. Pat. No. 7,590,728), which claims the benefit of priority under 35 U.S.C. 119(e) to U.S. Provisional Patent Application No. 60/551,697, filed Mar. 10, 2004, entitled "SYSTEM AND METHOD FOR DETECTION OF ABERRANT NETWORK BEHAVIOR BY CLIENTS OF A NETWORK ACCESS GATEWAY" by Steven D. Tonnesen, which is hereby fully incorporated by reference herein.

TECHNICAL FIELD OF THE INVENTION

Embodiments of the present invention relate to network security. More particularly, embodiments of the present invention relate to client management in networks organized using network access gateways.

BACKGROUND

The communication of data over networks has become an important, if not essential, way for many organizations and individuals to communicate. The Internet is a global network connecting millions of computers in which any computer connected to the Internet can potentially receive data from and send data to any other computer connected to the Internet. The Internet provides a variety of methods in which to communicate data, one of the most ubiquitous of which is the World Wide Web. Other methods for communicating data over the Internet include e-mail, usenet newsgroups, telnet, FTP, audio streams, and video streams.

Users typically access the Internet either through a computer connected to an Internet Service Provider ("ISP") or computer connected to a local area network ("LAN") provided by an organization, which is in turn, connected to the ISP. The ISP provides a point of presence to interface with the Internet backbone. Routers and switches in the backbone direct data traffic between the various ISPs.

To access a LAN and, in turn, the Internet, many organizations use a network access gateway to act as a consolidation point for traffic entering or leaving the LAN.

In this network topology, all of the clients using the same network access gateway share a common "backhaul" network connection to the ISP. Any network traffic traveling between a client computer on the LAN and the Internet must therefore pass through (i.e. be "routed" by) the network access gateway.

One common use of a network access gateway is to provide "NAT" (Network Address Translation) services to clients on the LAN. This function allows a single outward-facing IP address to be reused for some purposes by multiple clients inside the LAN. This feature is sometimes referred to as "IP masquerading".

The routing nature and IP masquerading nature of network access gateways often prevent an upstream ISP from sufficiently observing the traffic on the LAN side of the gateway. Particularly when NAT is enabled, the ISP is often unable to correlate traffic on the backhaul to particular clients behind the gateway.

Computers sometimes fall victim to malicious software ("malware") such as worms and viruses, which exploit vulnerabilities in the victim to gain control.

Once malware has infected a victim computer, a typical behavior is to attempt self-propagation. To propagate, the malware must find and infect other vulnerable computers. The search for additional victims is often conducted at a high rate of speed by means of network reconnaissance. The speed and intensity of the reconnaissance is often bound only by the available processor and network bandwidth resources.

Some types of malware are constructed so as to bombard a third-party victim with excessive network traffic. This case is sometimes referred to as a DoS (Denial of Service) attack. It may be referred to as a DDoS (Distributed Denial of Service) attack when there are many coordinated attackers.

Some types of malware do not produce persistent high volumes of network traffic. Clients infected with this type of malware are still at high risk because security measures have failed. These clients may also pose an additional threat to other LAN clients at any future time.

Yet another potential source of hostile network traffic is a user who intentionally operates a computer program that is designed to produce such traffic.

Whenever a LAN client or a number of LAN clients are subjected to traffic of sufficient volume and type, the LAN and/or the backhaul can become congested with the excessive traffic. This network congestion is a problem even for otherwise uninvolved LAN clients because of the reduction in the effective bandwidth of the shared backhaul. The congestion is a problem for the ISP because of bandwidth limitations and because of the costs associated with providing remediation and customer support. Furthermore, other computers both inside and outside of the LAN may become burdened by receiving excessive traffic.

Because of the inability of the ISP to observe or attribute LAN traffic behind a gateway to specific clients, it is difficult or impossible for the ISP to remotely assign responsibility or take corrective action against the infected clients or perpetrators.

One prior art method of finding the sources of network offenses is to take remote control of the gateway from upstream and to begin examining all of the LAN traffic manually. However, this scheme requires manual action, proper network observation tools on the gateway, and sufficient skill on the part of the analyst. This approach is also predicated on having enough remaining network capacity on the backhaul and enough remaining processing power on the gateway in order to successfully conduct the examination.

Another prior art method of finding the sources of network offenses is to physically or logically disconnect and reconnect clients while monitoring the network traffic on the gateway. However, this approach will disrupt the connectivity of innocent/uninfected clients. Further, it imposes requirements upon the LAN network architecture and typically requires human intervention throughout a potentially lengthy process.

SUMMARY OF THE INVENTION

Embodiments of the present invention provide a system and method of detecting aberrant network behavior by clients of a network access gateway that eliminates, or at least reduces, the shortcomings of prior art detection systems and methods. One embodiment of the present invention provides a system of detecting aberrant network behavior behind a network access gateway comprising a processor, a first network interface coupled to the processor, a second network interface coupled to the processor, a storage media accessible by the processor and a set of computer instructions stored on the storage media, executable by the processor. In one embodiment of the present invention, the computer instructions can be executable to observe network communications arriving at the first network interface from multiple clients and determine when the traffic of a particular client is indicative of malware infection or other hostile network activities. If any network communications are judged to be aberrant, the computer instructions can be executable to log such activity to storage media, or to notify an administrative entity via either the first network interface or second network interface, or to apply access controls upon particular clients' traffic.

Embodiments of the present invention provide an advantage over prior systems and methods of detecting aberrant network behavior by clients of a network access gateway by being able to operate without human intervention.

Embodiments of the present invention provide another advantage over prior systems and methods of detecting aberrant network behavior by clients of a network access gateway by requiring a lesser skill level when conducting manual traffic analysis.

Embodiments of the present invention provide another advantage over prior systems and methods of detecting aberrant network behavior by providing an observational approach that can continuously monitor all LAN traffic.

Embodiments of the present invention provide another advantage over prior systems and methods of detecting aberrant network behavior by providing an approach that does not require the disconnection of LAN clients to determine the source of the traffic in question.

Embodiments of the present invention provide another advantage over prior systems and methods of detecting aberrant network behavior by not requiring that a usable network connection exist between the network access gateway and the point of administrative control.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein:

FIG. 4 is a diagrammatic representation of an example configuration for a software module for accumulating information about suspected aberrant network behavior by clients of a network gateway, according to one embodiment of the present invention;

DETAILED DESCRIPTION

Figure 1:
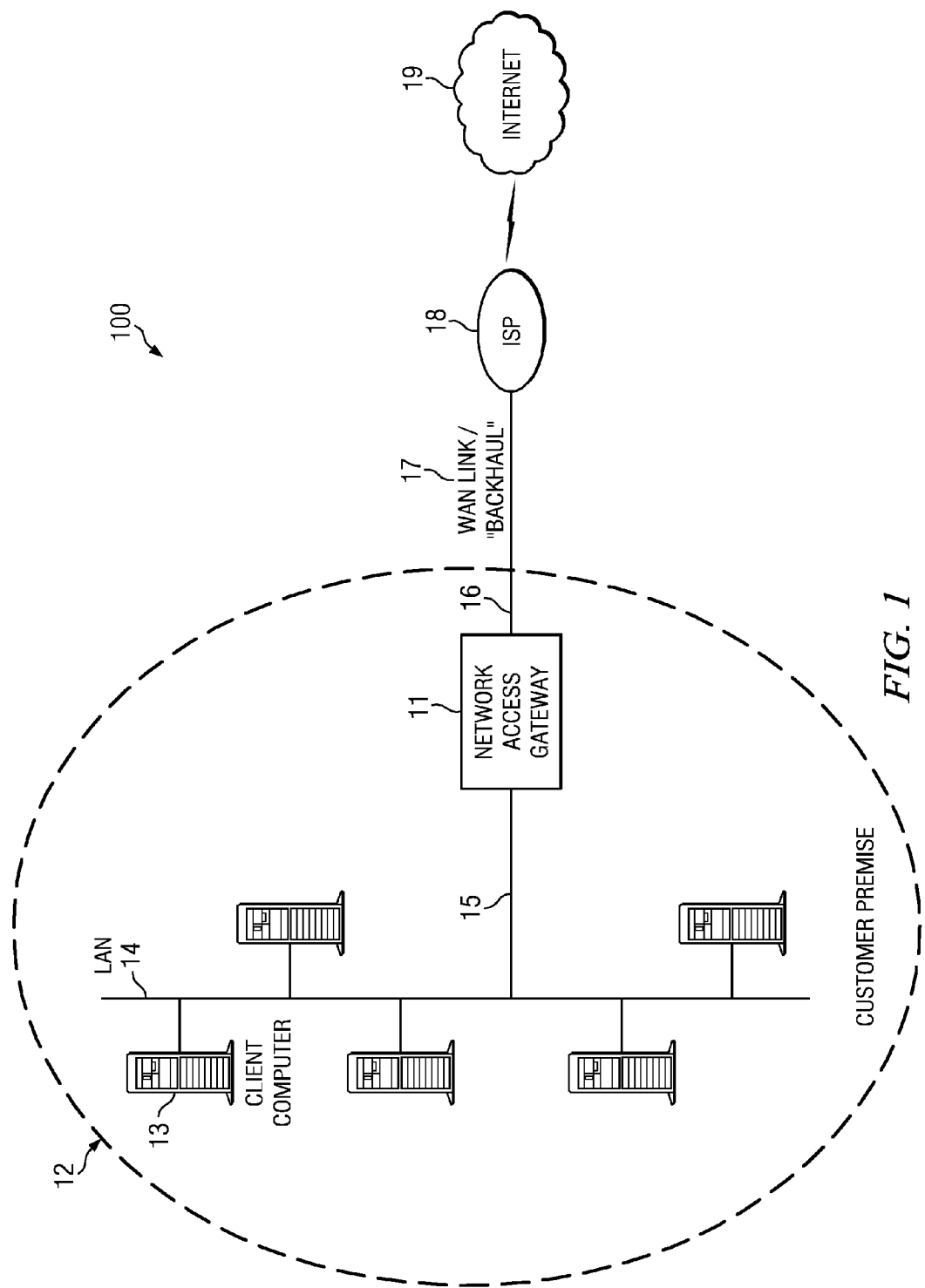
FIG. 1 is a diagrammatic representation of an example network illustrating an environment where a system for detecting aberrant network behavior by clients of a network gateway could exist according to one embodiment of the present invention.

The following applications are hereby fully incorporated by reference herein in their entirety: U.S. application Ser. No. 10/683,317, filed Oct. 10, 2003 entitled "SYSTEM AND METHOD FOR PROVIDING ACCESS CONTROL," by Richard MacKinnon, Kelly Looney, and Eric White; U.S. Provisional Application No. 60/551,698, filed Mar. 10, 2004 entitled "SYSTEM AND METHOD FOR BEHAVIOR-BASED FIREWALL MODELING," by Patrick Turley which converted into U.S. application Ser. No. 11/076,719, filed Mar. 10, 2005 entitled "SYSTEM AND METHOD FOR BEHAVIOR-BASED FIREWALL MODELING," by Richard MacKinnon, Kelly Looney, and Eric White; U.S. Provisional Application No. 60/551,754, filed Mar. 10, 2004 entitled "SYSTEM AND METHOD FOR COMPREHENSIVE CODE GENERATION FOR SYSTEM MANAGEMENT," by Keith Johnston which converted into U.S. application Ser. No. 11/078,223 filed Mar. 10, 2005 entitled "SYSTEM AND METHOD FOR COMPREHENSIVE CODE GENERATION FOR SYSTEM MANAGEMENT," by Keith Johnston; U.S. Provisional Application No. 60/551,703, filed Mar. 10, 2004 entitled "SYSTEM AND METHOD FOR PROVIDING A CENTRALIZED DESCRIPTION/CONFIGURATION OF CLIENT DEVICES ON A NETWORK ACCESS GATEWAY," by Patrick Turley and Keith Johnston; U.S. Provisional Application No. 60/551,702, filed Mar. 10, 2004 entitled "SYSTEM AND METHOD FOR ACCESS SCOPE CONTROL ("WALLED GARDENS") FOR CLIENTS OF A NETWORK ACCESS GATEWAY," by Patrick Turley, Keith Johnston, and Steven D. Tonnesen which converted into U.S. application Ser. No. 11/076,591, filed Mar. 10, 2005 entitled "METHOD AND SYSTEM FOR CONTROLLING NETWORK ACCESS," by Patrick Turley, Keith Johnston, and Steven D. Tonnesen; U.S. Provisional Application No. 60/551,699, filed Mar. 10, 2004 entitled "SYSTEM AND METHOD FOR DYNAMIC BANDWIDTH CONTROL," by Patrick Turley, et al.; U.S. Provisional Application No. 60/551,697, filed Mar. 10, 2004 entitled "SYSTEM AND METHOD FOR DETECTION OF ABERRANT NETWORK BEHAVIOR BY CLIENTS OF A NETWORK ACCESS GATEWAY," by Steven D. Tonnesen which converted into U.S. application Ser. No. 11/076,652, filed Mar. 10, 2005 entitled "SYSTEM AND METHOD FOR DETECTION OF ABERRANT NETWORK BEHAVIOR BY CLIENTS OF A NETWORK ACCESS GATEWAY," by Steven D. Tonnesen; U.S. Provisional Application No. 60/551,705, filed Mar. 10, 2004 entitled "SYSTEM AND METHOD FOR DOUBLE-CAPTURE/DOUBLE-REDIRECT TO A DIFFERENT LOCATION," by Keith Johnston, et al. which converted into U.S. application Ser. No. 11/076,646 filed Mar. 10, 2005 entitled "SYSTEM AND METHOD FOR DOUBLE-CAPTURE/DOUBLE-REDIRECT TO A DIFFERENT LOCATION," by Keith Johnston, et al.; U.S. Provisional Application No. 60/551,704, filed Mar. 10, 2004 entitled "SYSTEM AND METHOD FOR NETWORK MANAGEMENT XML ARCHITECTURAL ABSTRACTION," by Keith Johnston and Mario Garcia which converted into U.S. application Ser. No. 11/076,672 filed Mar. 10, 2005 entitled "SYSTEM AND METHOD FOR NETWORK MANAGEMENT XML ARCHITECTURAL ABSTRACTION," by Keith Johnston and Mario Garcia; and U.S. Provisional Application No. 60/660,408, filed Mar. 10, 2005 entitled "SYSTEM AND METHOD FOR PROVIDING A CENTRALIZED DESCRIPTION/CONFIGURATION OF CLIENT DEVICES ON A NETWORK ACCESS GATEWORK," by Patrick Turley, et al.

Preferred embodiments of the invention are illustrated in the FIGURES, like numerals being used to refer to like and corresponding parts of the various drawings.

Embodiments of the present invention provide a system and method of detecting aberrant network behavior by clients of a network access gateway. According to one embodiment of the present invention, a control device can sit between two networks (e.g., an Internet, a LAN or other network) functioning as a network access gateway (or gateway). As used herein, a network access gateway means any device with one or more network interfaces (of any type) that employs some form of control instruction(s) to observe, route, switch, filter, monitor, transfer, or otherwise make determinations about network traffic between one or more logical or physical network divisions or devices. This can include both "one-armed" and "observational" cases where the device performing the functions of the invention (e.g., the network access gateway) is attached to a single observed network). It should be recognized that a network access gateway is only one embodiment for implementing the aberrant behavior detection of the present invention. The detection system can reside within the gateway and monitor all network traffic passing through the gateway. When clients of the gateway produce problematic or suspicious types of network traffic that are observable by the gateway, the detection system can accumulate statistical or summary information about such traffic. If over time, the volume, type and/or pattern of aberrant traffic meet configurable thresholds, the detection system can perform configurable actions in response. Example response actions could include logging data about the event to storage or alerting another entity of the event. The entity notified of the event could be another portion of the gateway or software module inside or outside of the network gateway, or it could be any computer or computers networked to the gateway. Examples of the latter could be an administrative console or a monitoring system operated by an ISP. As used herein, client(s) of the gateway, client(s) of the network gateway or simply client(s), mean network entities or devices (and components, software, etc. thereof) on a gateway connected network. A client can be any networked computing device (or even logical computing device that shares a connection).

FIG. 1 is a diagrammatic representation of an example network topology 100 illustrating an environment where an embodiment of the present invention could be used Client computers 13 on a LAN network 14 located in a customer premise 12 are connected to the Internet 19 via a network access gateway 11. The gateway 11 has two network interfaces, a LAN interface 15 and a WAN interface 16. All network traffic from the client computers 13 bound for the Internet 19 are routed by the gateway 11 over the shared WAN link 17 to an Internet Service Provider (ISP) 18. The ISP 18 routes network traffic to and from the Internet 19.

It should be noted that FIG. 1 is provided by way of example only. In other embodiments of the present invention, the networks attached to the control device 11 can be any networks known in the art including, but not limited to, LANs, WANs, the Internet, global communications networks, wireless networks and/or any other communications network.

According to one embodiment of the present invention, client computer 13 can comprise any computing device known in the art (e.g., desktop, laptop, PDA, mobile phone or any other device capable of network communication) and can be connected to control device 11 in any manner known in the art (e.g., by LAN, wireless network, direct connection or other manner known in the art).

Figure 2:
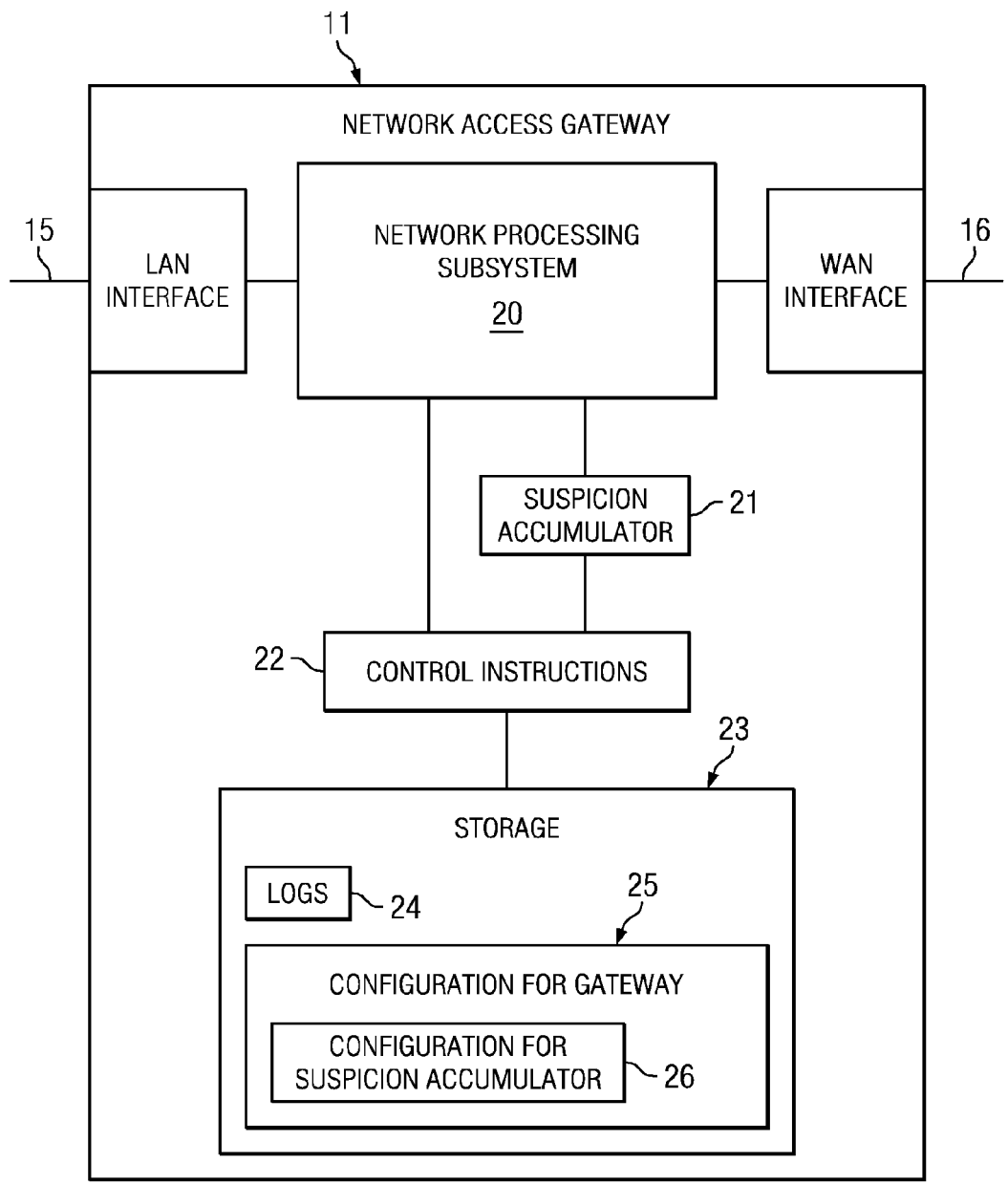
FIG. 2 is a diagrammatic representation of a network access gateway illustrating one embodiment a method for detecting aberrant network behavior by clients of a network gateway.

FIG. 2 is a diagrammatic representation of one embodiment of the network access gateway 11 of FIG. 1 illustrating one embodiment of a method for detecting aberrant network behavior. Client traffic (e.g., data) arriving on the LAN interface 15 is received by the network processing subsystem 20 where control instructions 22 are applied. The control instructions 22 may be derived in part or whole from the gateway configuration 25. The control instructions may cause the network processing subsystem 20 to discard, alter, reprioritize and/or deliver the client traffic to the WAN interface 16. In this embodiment of the method, the subsystem 20 can also notify the suspicion accumulator 21 with a copy of the traffic or with summary information about the traffic and the conditions under which the traffic was observed.

In this embodiment of the present invention, the suspicion accumulator 21 system collects and analyzes summary and statistical information about client traffic. Summary information can include, for example, packet header information (such as OSI layer 2 and layer 3 header information). For example, in a TCP/IP packet, header information can include source and destination MAC addresses, source and destination network addresses and ports, protocol number, etc. The accumulator 21 checks its collected data for each client, and applies instructions from the configuration 26 to determine if and when a particular client's traffic should be considered aberrant.

In this embodiment of the detection system within network access gateway 11, when the suspicion accumulator 21 determines that a particular client's traffic should be considered aberrant, the gateway 11 can perform response actions specified by the control instructions 22. Example response actions include: storing a record of the condition in the gateway's logs 24, notifying other portions of the instructions 22, or notifying an external entity via the LAN interface 15 or WAN interface 16. For the sake of example, such notifications could occur using an SNMP trap.

Figure 3:
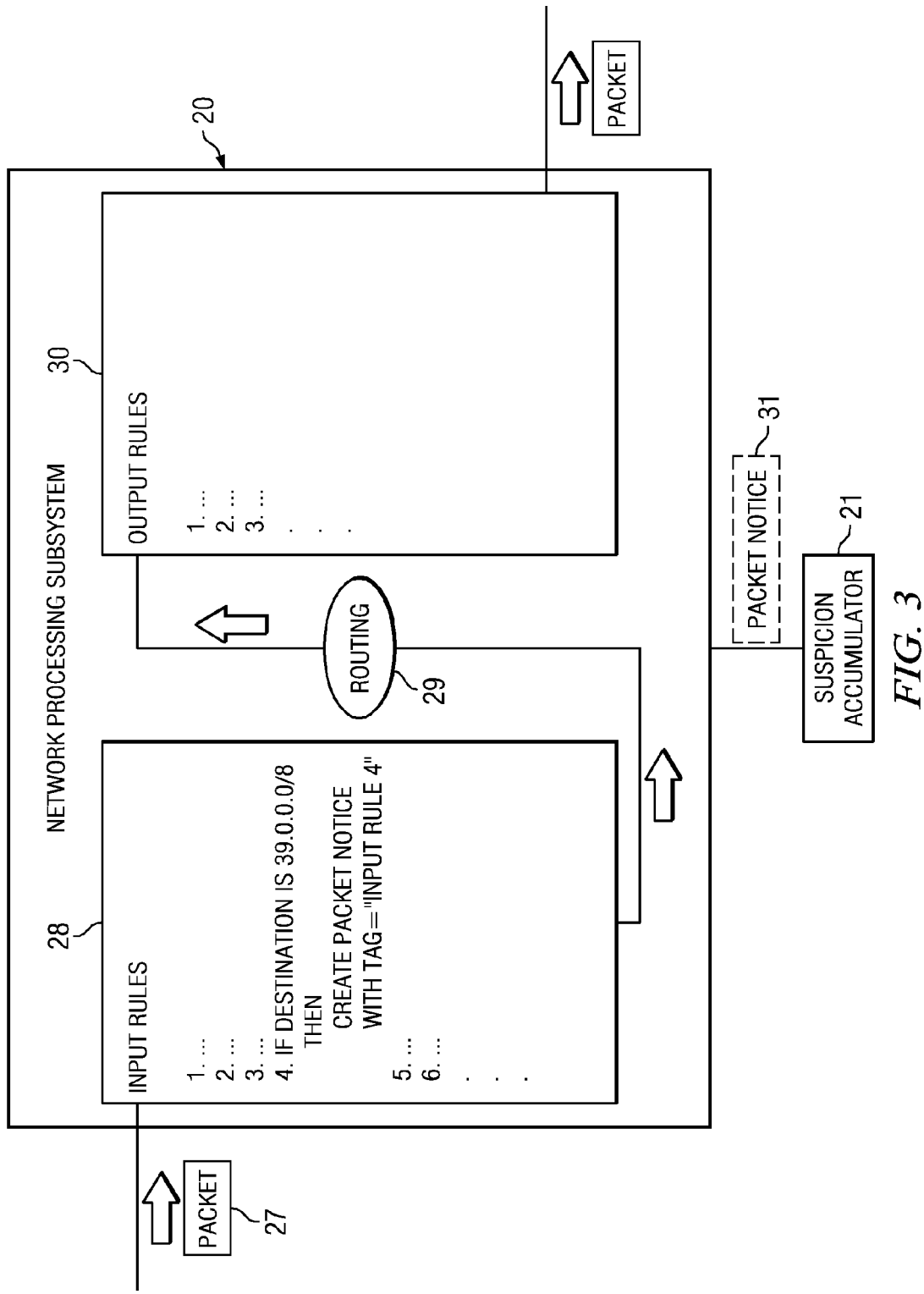
FIG. 3 is a diagrammatic representation of a portion of a network access gateway illustrating one embodiment of an observation method for detecting aberrant network behavior by clients of the network access gateway.

FIG. 3 is a diagrammatic representation of one embodiment of a portion of a network access gateway 11 illustrating one embodiment of an observation method for detecting aberrant network behavior by clients of the network access gateway 11. The network processing subsystem 20 in this example receives traffic in the form of a packet 27. In a typical traversal of the subsystem 20, each packet is examined according to a sequence of input rules 28. If the packet being handled is not discarded by any of the input rules, a routing decision 29 is made. Following the routing step 29, a sequence of output rules 30 is similarly applied before the packet leaves the subsystem.

In the embodiment of the detection system exemplified in FIG. 3, the input rules 28 and output rules 30 can be used to identify particular packets likely to be indicative of aberrant network behavior by a client. For the sake of example, the fourth enumerated rule of the input rule set 28 examines the destination of each IP packet 27 for addresses in a currently unassigned range 39.0.0.0/8. When a packet matches this rule, a packet notice 31 is delivered to the suspicion accumulator 21. The packet notice 31 contains summary information about the packet 27 (such as source IP address, source MAC address, destination IP address, protocol number, etc.). The packet notice 31 also contains additional information about the rule that triggered the generation of the packet notice (in this case a rule tag indicates the packet notice is a result of the fourth enumerated rule from the set of input rules 28).

It should be noted that in the embodiment depicted in FIG. 3, the input rules 28 are present to illustrate the relationship of the rules to the flow of packets and the relationship to the creation of packet notices 31. The example illustrates only a single means by which client traffic can be identified as potentially suspicious. In this case, a packet addressed to a currently invalid address range indicates that a randomized search operation could be being conducted by a worm. Many other means of identifying packets as suspicious exist in the art and should be known to a practitioner. Examples of means to identify suspicious packets include: packets with destination addresses which have not been assigned or are otherwise forbidden or illogical, packets directed to a blacklisted host, packets that represent new connections to a large number of remote destinations within a short period of time, packets that appear to be part of a port scanning operation, packets that contain content known to be associated with hostile activity, packets with MAC addresses that do not match reserved MAC/IP pairings known to the gateway, packets indicating an excessive number SMTP connections or ICMP contacts within a short period of time, excessive ICMP 'Destination Unreachable' packets returning from the Internet, packets that are malformed or illegal in some way according to network protocol definitions, etc.

In one embodiment of the present invention, traffic observation rules can be implemented within a Linux system by using netfilter matches within iptables. As would be understood by those of ordinary skill in the art, iptables allows construction of linked sequence of rules that can be used to discriminate, sort, test, alter, and otherwise act upon network traffic at the packet level.

In one embodiment of the present invention, the delivery mechanism from the network processing subsystem to the suspicion accumulator can be accomplished in a Linux system by using the "ULOG" netfilter action to transfer information about matched packets to the "ulogd" daemon. As would be understood by those of ordinary skill in the art, ulogd allows customized packet decoding and delivery to additional entities such as the suspicion accumulator 21.

It should be noted that because of the ability to discriminate individual clients or client, the observation rules used by the detection system can be user-specific. Further, the observation rules and detection thresholds may be dynamically adjustable for reasons such as optimization of system performance or correction of sensitivity to certain types of traffic.

It should be further noted that the use of dynamic variations in detection system sensitivity or configuration can be implemented in any suitable manner, as would be understood by those of ordinary skill in the art.

FIG. 4 is a representation of one embodiment of a configuration for a suspicion accumulator 26 as could be used for detecting aberrant network behavior. The first section 32 of the configuration 26 defines the structure of a data storage element that can be used for tracking the history of a particular client over a period of time. This structure is termed a CHT (Client History Tracking structure) and is further depicted internally in FIG. 5. CHT structures conceptually consist of a number of rows of data cells, where each cell is capable of holding a data value, and each row may contain a different number of cells, as specified by the configuration. Over time, the cells within a particular row become filled with data, and system is capable of reusing the cells by "wrapping" around the row. Auxiliary tracking information can be maintained to implement the wrapping capability. The approach thus uses a fixed memory size for each CHT structure.

The second configuration section 33 defines a mapping table which ties observation rule tags (as used in rules 28 from FIG. 3) to data row names as defined in the CHT definition 32. Any particular rule tag may have zero or more mapping entries. Each entry the mapping table can also contain an associated scaling factor, which can be used by a configuration designer to multiply the effect of an observation rule in application to certain CHT rows. This allows a particular CHT row to potentially receive separately scaled input from multiple rule tag mapping entries.

The third configuration section 34 in this embodiment of the present invention defines tests and threshold limits that are to be applied to the data contained in CHT structures in order to determine the presence of abnormal network behavior by a client. Each test will be applied to a single CHT row. Zero or more tests can be applied for any particular CHT row name.

The test descriptions in configuration section 34 are intended to illustrate for the sake of example the basic types of mathematical or algorithmic tests that can be applied to historical observations tracked on a per-client basis by this embodiment of the system. As would be obvious to any practitioner of the art, there are numerous possible ways to represent, define, declare, or specify these operations. Further, it should be anticipated that more sophisticated mathematical operations than shown in the figures (such as correlation and predictive extrapolation) will be useful in the accurate detection of aberrant network behavior.

Figure 5:
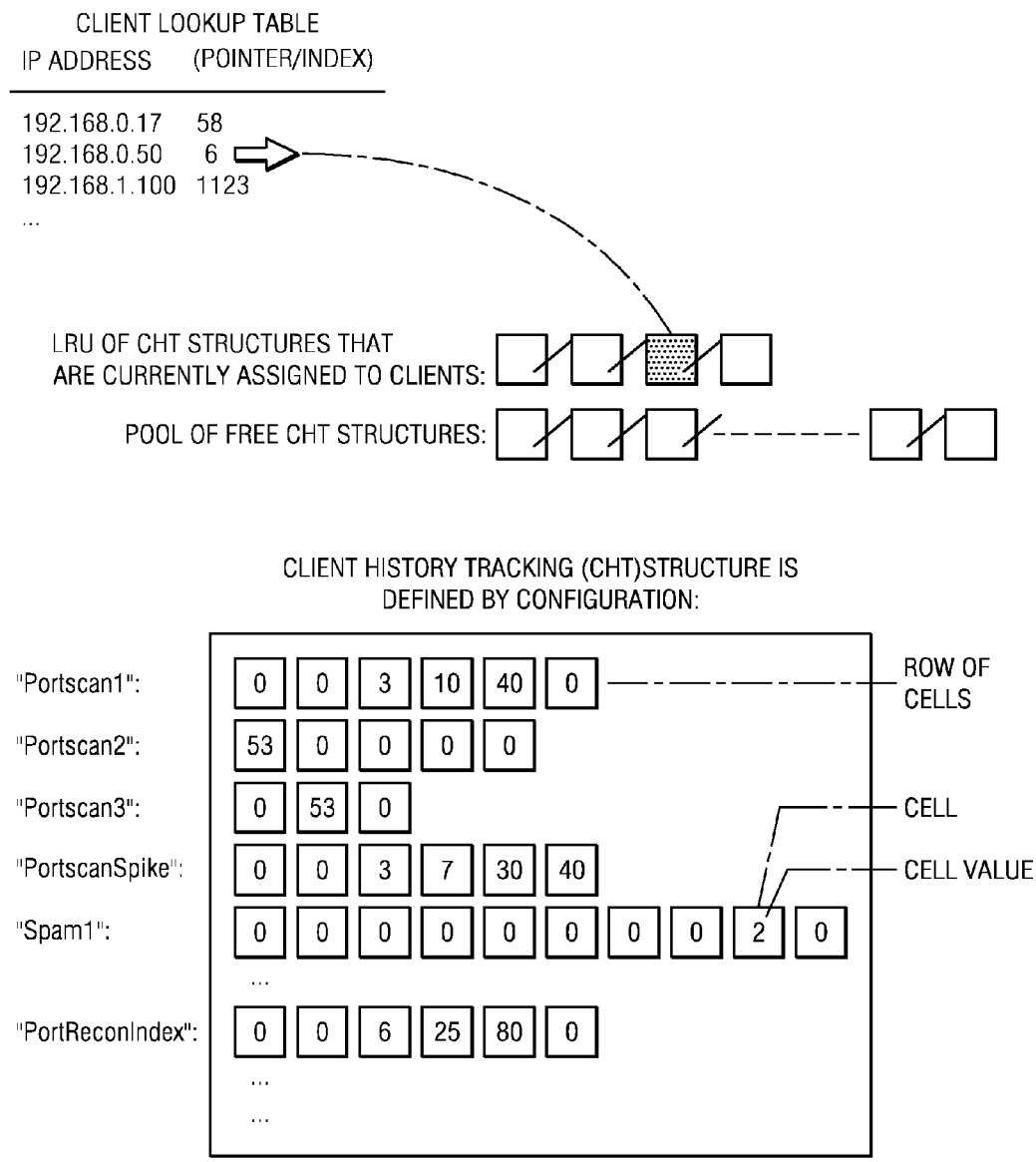
FIG. 5 is an example representation of some data structures used in one embodiment of the present invention.

FIG. 5 is a representation of several embodiments of data structures that can be used in first section 32 of configuration 26 (see FIG. 4). The system can maintain two lists of CHT structures: one list holds CHT structures that are currently assigned to track a particular client identifier, and another list holds unused (free) CHT structures. The in-use list is maintained in a least recently used (LRU) fashion to assist with timely and relevant recycling of CHT blocks if it should become necessary because of storage limitations. This optimization would be useful should the system need to track a very large number of clients simultaneously when some portion of the clients are inactive, disconnected, or otherwise absent for extended periods.

In one embodiment of the present invention, a lookup table (for example a hash table) is maintained to enable the rapid location of a particular client's corresponding CHT structure when given the client's identity information (source IP address for example).

The CHT structure depicted in FIG. 5 corresponds to the configuration section 32 of FIG. 4. This approach uses a contiguous block of memory for the rows and cells of each CHT structure. The CHT structures themselves are allocated at the time the suspicion accumulator is initialized and placed in the free list for subsequent use when needed. It should be noted that these memory allocation techniques and structure definitions are chosen for illustrative purposes, and that a practitioner skilled in the art could reasonably be expected to use any of several similar or related data structures and similar or related memory management techniques.

Figure 6:
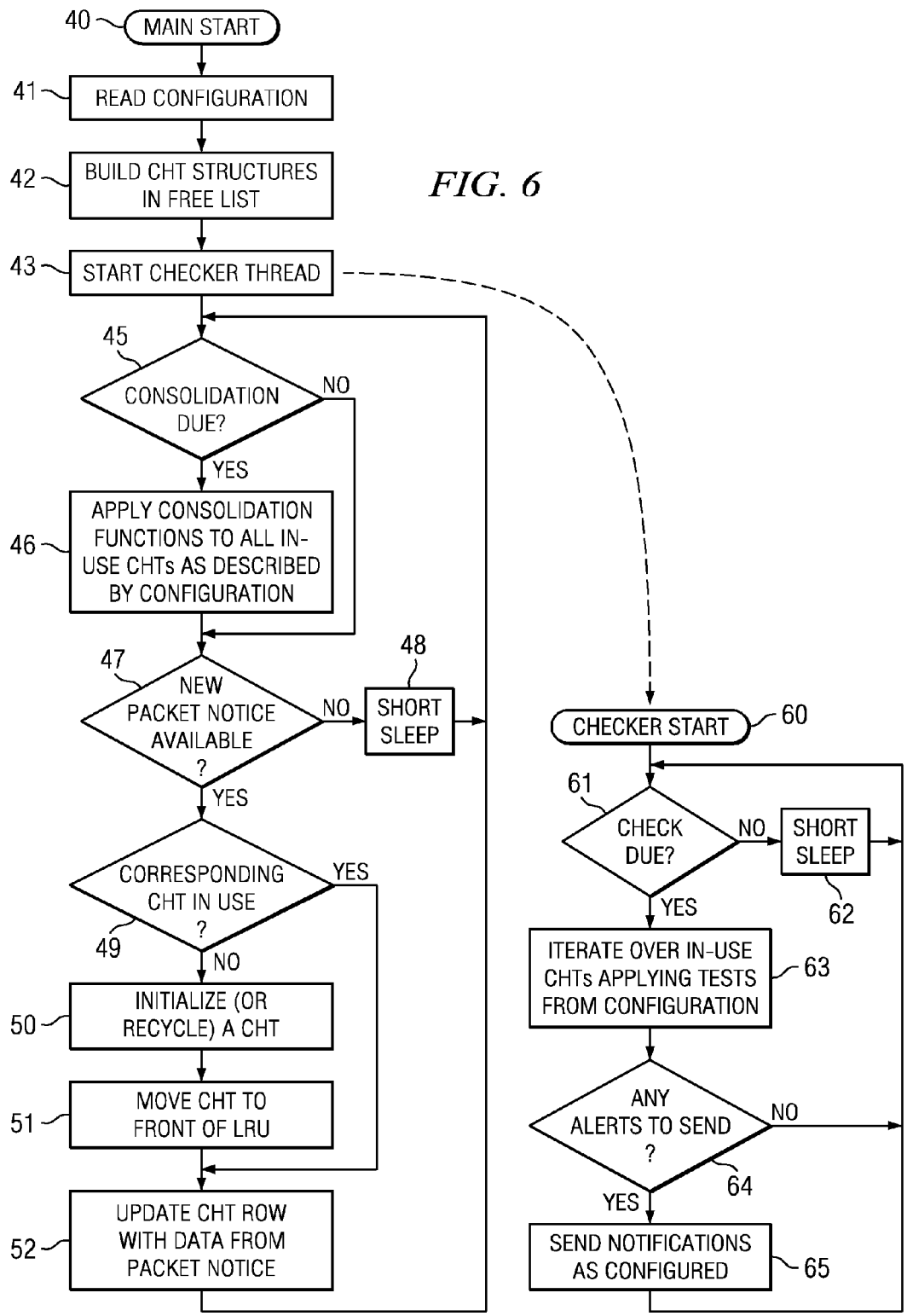
FIG. 6 is a flow chart illustrating one embodiment of a method for detecting aberrant network behavior

FIG. 6 is a flow chart illustrating one embodiment of a method for detecting aberrant network behavior according to the present invention. At step 40, the suspicion accumulator 21 begins execution and reads configuration information, and then initializes its CHT memory structures and supporting lookup table(s). At step 43, a separate thread of control is spawned to perform testing of CHT data.

Continuing with the main thread of control in the example embodiment, at step 45 the system determines whether enough time has elapsed since the last consolidation processing occurred. If so, consolidation processing 46 is conducted or repeated. The consolidation operation applies configured changes to the in-use CHT structures. Examples of consolidation operations are a time series decay algorithm, other aggregation algorithm or mathematical function, or re-initialization of a cell or cells. These consolidation instructions are expressed or defined within the configuration section 32. It should be noted that a practitioner skilled in the art could reasonably be expected to use any of several means of expressing, defining, or representing consolidation algorithm instructions within the configuration or the operating instructions.

At step 47, the main thread of control in the example embodiment checks whether any new packet notices 31 have become available at the input of the suspicion accumulator 21. If so, in steps 49-51 a CHT structure corresponding to the client is located. At step 52, the rule tag is read from the packet notice and compared to the mappings in configuration section 33. For each match, the corresponding CHT row data is updated according to the scaling factor and the instructions expressed in configuration section 32.

At step 60, a new thread of control is executing in the example embodiment. This thread is created for the periodic testing of CHT data. Whenever a check is due at step 61, the system applies the tests configured in section 34 to eligible in-use CHT structures. Whenever the test conditions are satisfied and indicate the detection of aberrant network behavior by a client, alerts are sent to internal or external entities in step 65.

It should be noted that the polling nature and iterative operational nature expressed in the example embodiment and depicted in the flowchart of FIG. 6 are presented primarily for illustrative purposes. A practitioner skilled in the art would reasonably be expected to be able to implement other, and even more efficient, means of accomplishing equivalent functionality.

Although shown as an internal portion of a network access gateway 11 in FIG. 2, suspicion accumulator 21 may be separated from the gateway and used externally. A suspicion accumulator may also be shared across multiple gateways or used in conjunction with network probe devices possessing comparable network processing subsystems.

Additionally, suspicion accumulator 21 can be executed by multiple processors. One example of an exemplary suspicion accumulator is the Rocksteady NSA Server, from Rocksteady Networks, Inc. of Austin, Tex.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A system for detecting aberrant network, comprising:
a processor;
a first network interface coupled to the processor, wherein the first network interface is coupled to one or more clients;
a memory accessible by the processor;
wherein the system is configured to:
    receive network communications at the first network interface, wherein each of the network communications is associated with a first client; and
    determine if aberrant network behavior is occurring with respect to the first client, wherein determining if the network behavior is aberrant comprises:
    analyzing the received network communications based upon one or more rules to determine if the network communications match any of the one or more rules, wherein the one or more rules are configured to identify particular network communications,
    if a network communication associated with the first client matches a first rule: updating a first set of statistical information associated with the first client, wherein the first set of statistical information is accumulated over a time period and is associated with at least the first rule of the one or more rules, and
    applying a set of conditions to the first set of statistical information, each of the set of conditions corresponding to aberrant network behavior and comprising a threshold to be applied to at least a portion of the statistical information.

2. The system of claim 1, wherein the first set of statistical information is associated with a second client.

3. The system of claim 2, wherein the first set of statistical information is associated with a second rule.

4. The system of claim 2, further configured to:
receive network communications at the first network interface, wherein each of the network communications is associated with the second client; and
determine if aberrant network behavior is occurring with respect to the second client, wherein determining if the network behavior is aberrant comprises:
analyzing the received network communications based upon the one or more rules to determine if the network communication matches any of the one or more rules, wherein the one or more rules are configured to identify particular network communications, and
if a network communication associated with the second client matches the second rule updating the first set of statistical information, and
applying the set of conditions to the first set of statistical information.

5. The system of claim 1, wherein the first statistical information comprises a first set of lists.

6. The system of claim 5, wherein the first set of lists corresponds to the first client.

7. The system of claim 6, wherein updating the first set of statistical information comprises updating a first list of the first set of lists wherein the first list is associated with at least the first rule of the one or more rules.

8. A method for detecting aberrant network in a first network interface coupled to a processor and one or more clients, comprising:
receiving network communications at the first network interface, wherein each of the network communications is associated with a first client; and
determining if aberrant network behavior is occurring with respect to the first client wherein determining if the network behavior is aberrant comprises:
analyzing the received network communications based upon one or more rules to determine if the network communication matches any of the one or more rules, wherein the one or more rules are configured to identify particular network communications,
if a network communication associated with the first client matches a first rule: updating a first set of statistical information associated with the first client, wherein the first set of statistical information is accumulated over a time period and is associated with at least the first rule of the one or more rules, and
applying a set of conditions to the first set of statistical information, each of the set of conditions corresponding to aberrant network behavior and comprising a threshold to be applied to at least a portion of the statistical information.

9. The method of claim 8, wherein the first set of statistical information is associated with a second client.

10. The method of claim 9, wherein the first set of statistical information is associated with a second rule.

11. The method of claim 9, further comprising:
receiving network communications at the first network interface, wherein each of the network communications is associated with the second client; and
determining if aberrant network behavior is occurring with respect to the second client, wherein determining if the network behavior is aberrant comprises:
analyzing the received network communications based upon the one or more rules to determine if the network communication matches any of the one or more rules, wherein the one or more rules are configured to identify particular network communications,
if a network communication associated with the second client matches the second rule updating the first set of statistical information, and
applying the set of conditions to the first set of statistical information.

12. The method of claim 8, wherein the first statistical information comprises a first set of lists.

13. The method of claim 12, wherein the first set of lists corresponds to the first client.

14. The method of claim 13, wherein updating the first set of statistical information comprises updating a first list of the first set of lists wherein the first list is associated with at least the first rule of the one or more rules.

15. A tangible non-transitory computer readable medium comprising instructions to:
receive network communications at the first network interface, wherein each of the network communications is associated with a first client; and
determine if aberrant network behavior is occurring with respect to the first client, wherein determining if the network behavior is aberrant comprises:
analyzing the received network communications based upon one or more rules to determine if the network communication matches any of the one or more rules, wherein the one or more rules are configured to identify particular network communications,
if a network communication associated with the first client matches a first rule: updating a first set of statistical information associated with the first client, wherein the first set of statistical information is accumulated over a time period and is associated with at least the first rule of the one or more rules, and
applying a set of conditions to the first set of statistical information, each of the set of conditions corresponding to aberrant network behavior and comprising a threshold to be applied to at least a portion of the statistical information.

16. The computer readable medium of claim 15, wherein the first set of statistical information is associated with a second client.

17. The computer readable medium of claim 16, wherein the first set of statistical information is associated with a second rule.

18. The computer readable medium of claim 16, wherein the non-transitory computer readable medium further comprises instructions to:
receive network communications at the first network interface, wherein each of the network communications is associated with the second client; and
determine if aberrant network behavior is occurring with respect to the second client wherein determining if the network behavior is aberrant comprises:
analyzing the received network communications based upon the one or more rules to determine if the network communication matches any of the one or more rules, wherein the one or more rules are configured to identify particular network communications,
if a network communication associated with the second client matches the second rule updating the first set of statistical information, and
applying the set of conditions to the first set of statistical information.

19. The computer readable medium of claim 15, wherein the first statistical information comprises a first set of lists.

20. The computer readable medium of claim 19, wherein the first set of lists corresponds to the first client.

21. The computer readable medium of claim 20, wherein updating the first set of statistical information comprises updating a first list of the first set of lists wherein the first list is associated with at least the first rule of the one or more rules.

* * * * *